US008570191B2

(12) United States Patent
Cahill

(10) Patent No.: US 8,570,191 B2
(45) Date of Patent: *Oct. 29, 2013

(54) SYSTEMS AND METHODS FOR COMPREHENSIVE TIRE PRESSURE MONITORING AND WHEEL SPEED DETECTION

(75) Inventor: Eric D. Cahill, Troy, OH (US)

(73) Assignee: Goodrich Corporation NC (US)

( * ) Notice: Subject to any disclaimer, the term of this patent is extended or adjusted under 35 U.S.C. 154(b) by 984 days.

This patent is subject to a terminal disclaimer.

(21) Appl. No.: 12/642,321

(22) Filed: Dec. 18, 2009

(65) Prior Publication Data

US 2011/0148396 A1   Jun. 23, 2011

Related U.S. Application Data

(63) Continuation of application No. 12/642,092, filed on Dec. 18, 2009, now Pat. No. 8,427,293.

(51) Int. Cl.
*G08B 23/00* (2006.01)

(52) U.S. Cl.
USPC ............................. 340/969; 340/442; 73/146

(58) Field of Classification Search
USPC .................. 340/969, 442, 443, 444; 73/146; 116/34 B
See application file for complete search history.

(56) References Cited

U.S. PATENT DOCUMENTS

| 7,021,132 B2 | 4/2006 | Nigon et al. |
| 8,082,075 B2 | 12/2011 | Hammerschmidt et al. |
| 2004/0075022 A1 | 4/2004 | MacKness |
| 2005/0110622 A1 | 5/2005 | Tsai |
| 2005/0251306 A1 | 11/2005 | Gowan et al. |

FOREIGN PATENT DOCUMENTS

| DE | 3242291 | 5/1984 |
| EP | 0642937 | 3/1995 |
| EP | 1844998 | 10/2007 |
| JP | 07134077 | 11/1993 |

OTHER PUBLICATIONS

Final Office Action for U.S. Appl. No. 12/642,092 dated Nov. 2, 2012.
Patent Acts 1977: Combined Search and Examination Report under Sections 17 and 18(3) dated Jan. 25, 2011.
Patent Acts 1977: Search Report under Section 17(6) dated Apr. 8, 2011.
Office Action dated Jun. 1, 2012 in U.S. Appl. No. 12/642,092.
FR; Office Action dated Feb. 15, 2011 in Application No. 10 59860.
USPTO; Notice of Allowance dated Dec. 19, 2012 in U.S. Appl. No. 12/642,092.

*Primary Examiner* — John A Tweel, Jr.
(74) *Attorney, Agent, or Firm* — Snell & Wilmer L.L.P.

(57) ABSTRACT

Systems and methods facilitate the monitoring of tire pressure, the detection/determination of wheel speed, or a combination thereof. A system is provided comprising a hub cap, a target coupled to the hub cap, and at least two displacement sensors configured to measure a displacement between each displacement sensor and the target. The target has a variable thickness, and the target comprises a hollow vessel in fluid communication with a tire.

8 Claims, 12 Drawing Sheets

Fig. 9A
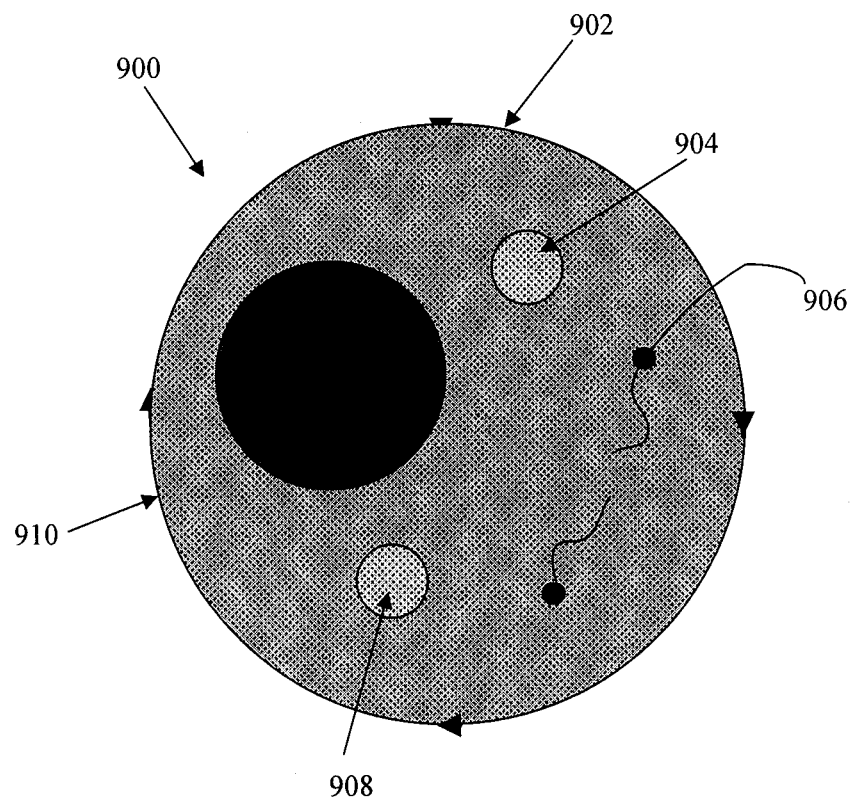
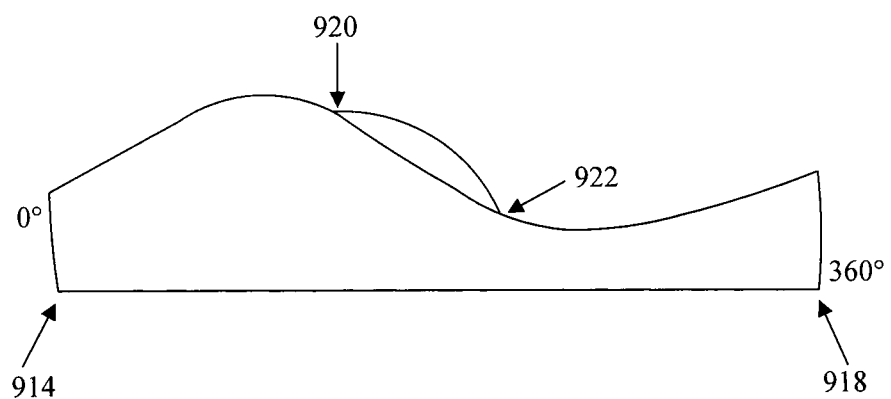
Fig. 9B

SYSTEMS AND METHODS FOR COMPREHENSIVE TIRE PRESSURE MONITORING AND WHEEL SPEED DETECTION

CROSS-REFERENCE TO RELATED APPLICATIONS

This application is a continuation of U.S. patent application Ser. No. 12/642,092, filed on Dec. 18, 2009, now U.S Pat. No. 8,427,293 and entitled "SYSTEMS AND METHODS FOR COMPREHENSIVE TIRE PRESSURE MONITORING AND WHEEL SPEED DETECTION." The '092 application is incorporated by reference herein in its entirety.

The present disclosure is related to systems and methods for tire pressure monitoring and wheel speed detection.

BACKGROUND

The detection of wheel speed is important in a variety of vehicles, from aircraft to automobiles. Such devices provide wheel speed feedback to other system components for enhanced vehicle control. For example, in aircraft, wheel speed information may be used in components that control braking. Wheel speed information may also be beneficial for the operation of certain anti-skid systems as well.

Conventional aircraft wheel speed sensors often use a gear assembly disposed in an axle. The gear assembly is coupled with a blade that is in mechanical communication with an aircraft wheel or hubcap. For example, the blade may be coupled to a hubcap with a spring clip and/or a screw. The motion of the blade drives the gear assembly. The gear assembly comprises an inside gear and an outside gear coupled with magnetic components such that the gear assembly functions as an electrical generator. Electrical components are typically coupled to the gear assembly to monitor output voltages. These components may then determine wheel speed based upon this information. Thus, the blade and clip are subject to mechanical wear and need to be monitored for required maintenance, mechanical failures, and potential misalignments. Such devices may also be prone to misalignment and/or other unintended spatial displacements that may affect performance. Further, such a component cannot detect a speed of 0 because there is no motion to drive the gear assembly. Moreover, such conventional devices typically lose accuracy at low speeds (e.g., below 8 knots). In addition, as conventional means typically rely on measuring "pulse" after a predetermined rotational distance, very low speeds are not able to be detected. Accordingly, there is a need for more accurate measurement of wheel speed at low speeds and very low speeds.

In addition to wheel speed, the monitoring of tire pressure is also important in a variety of vehicles. Proper tire pressure enhances efficiency and safety of a vehicle, and improper tire pressure may require repairs.

Conventional tire pressure monitors often use a wireless enabled pressure reading device in fluid communication with a tire. The tire pressure monitor reads tire pressure by way of its fluid communication channel with the tire. The monitor then transmits pressure information wirelessly (e.g., via RF signal) to another component for monitoring. However, it may be difficult to power such a system, and the RF signal may be disturbed by other RF signals produced in an aircraft.

These and other conventional systems for tire pressure monitoring and/or wheel speed detecting tend to be unnecessarily complex, costly, and prone to mechanical failures or wear.

Accordingly, there is a need for systems for tire pressure monitoring and/or wheel speed detecting that address at least one of these issues. For example, there is a need for non-contact or reduced contact systems and methods for tire pressure monitoring and/or wheel speed detecting.

SUMMARY

Systems and methods disclosed herein may be useful for the monitoring of tire pressure, the detection/determination of wheel speed, or a combination thereof.

A system is provided comprising a hub cap, a target coupled to the hub cap, and at least two displacement sensors configured to measure a displacement between each sensor and the target. The target has a variable thickness, and the target comprises a hollow vessel in fluid communication with a tire.

A system is provided comprising a hub cap coupled to a hollow vessel. The hollow vessel is in fluid communication with a tire and a displacement sensor. The vessel comprises a cylindrical portion having a first thickness and a cross sectional portion having a second thickness, wherein the first thickness is greater than the second thickness. The displacement sensor measures a displacement between the displacement sensor and the cross sectional portion of the hollow vessel.

A method is provided comprising rotating an aircraft hub cap from 0 degrees to about 359 degrees; measuring, using at least two displacement sensors, the distance between each displacement sensor and a target coupled to the hub cap; collecting a displacement data point during rotation of the hub cap for each sensor; collecting a time data point associated with the displacement data; and determining aircraft speed based upon said displacement data.

A system is provided comprising a hub cap, a target coupled to the hub cap, and a displacement sensor configured to measure a displacement between the sensor and the target, wherein the target has a variable thickness.

A method is provided comprising rotating an aircraft hub cap from 0 degrees to about 359 degrees; measuring, using a displacement sensor, the distance between the displacement sensor and a target coupled to the hub cap; collecting at least two displacement data points during rotation of the hub cap; collecting a time data point relating to each of the displacement data; and determining aircraft speed based upon said displacement data.

BRIEF DESCRIPTION OF THE DRAWINGS

FIG. 9a illustrates a tire pressure monitor system and wheel speed detection system in accordance with various aspects of an embodiment;

FIG. 9b illustrates a graph associated with a tire pressure monitor system and wheel speed detection system in accordance with various aspects of an embodiment;

DETAILED DESCRIPTION

Figure 1:
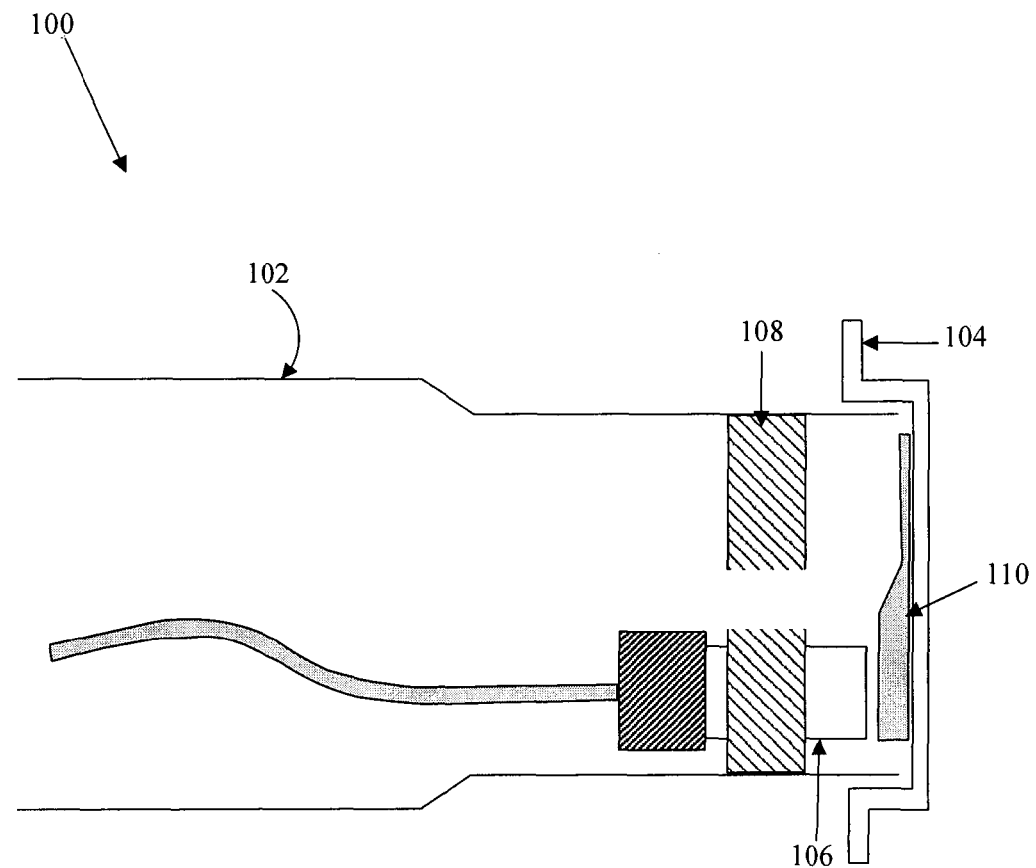
FIG. 1 illustrates a cross section view of a wheel speed detection system in accordance with various aspects of an embodiment.

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for the monitoring of tire pressure, the detection/determination of wheel speed, or a combination thereof. Although the embodiments herein are described with reference to an aircraft, such embodiments are provided for example only as it is contemplated that the disclosures herein have applicability to other vehicles comprising at least one wheel, such as automobiles.

In various embodiments, wheel speed detection comprises the measurement of distance (also referred to herein as displacement) between a sensor and a variable thickness target. In various embodiments, the variable thickness target is coupled to a hubcap.

A sensor may measure the distance between a sensor and a variable thickness target at least twice. Using the change in distance and the time at which each measurement was made, wheel speed may be determined. Wheel speed may then be used to determine aircraft acceleration or velocity.

For example, for a given variable thickness pattern, wheel speed may be determined by correlating a rotational location on the variable thickness target to the distance between the sensor and the variable thickness target. Thus, for a given distance between the sensor and the variable thickness target (referred to as a distance measurement), a rotational location on the variable thickness target may be known. Accordingly, when a second distance measurement is made, it may also be correlated with a second rotational location. For two distance measurements, the distance between each rotational location may be calculated to determine a rotational distance. Wheel speed may be determined by dividing this rotational distance over the time interval between distance measurements. Such calculations may be performed by any suitable aircraft components, such as a wheel speed detection module, discussed herein below. Further, if at least two wheel speed determinations are made over a given time period, acceleration may be determined by calculating the change in wheel speed over the time interval between wheel speed measurements.

A variable thickness target may be any device having a variable thickness which may be used to correlate a thickness with a rotational location on the variable thickness target. For example, a variable thickness target may be of any shape, such as any polyhedron, a cylinder, or an irregular shape. For example, in various embodiments, a variable thickness target may be cylindrical. A variable thickness target may be comprised of any material, such as metal, plastic, or a composite material.

A variable thickness target may comprise any thickness that may be considered non-uniform. For example, a cross section of a cylindrical variable thickness target may have a constant diameter but varying thickness. In various embodiments, a cylindrical variable thickness target may have a thickness such that there is a maximum thickness adjacent to a minimum thickness (hereinafter referred to as a step configuration), although in other embodiments a variable thickness target may have maximum thickness located about 180 degrees from a minimum thickness (hereinafter referred to as wave configuration). Alternatively, some embodiments comprise multiple maximum thicknesses and minimum thicknesses positioned at various rotational locations (e.g., 45°, 90°, etc). A cylindrical variable thickness target may comprise two circular bases connected by a cylindrical wall. In this embodiment, thickness may be measured as the distance between the two bases along the cylindrical wall.

A sensor may comprise any sensor that is capable of determining distance between the sensor and another object (referred to as the measured object). A sensor may also be referred to herein as a displacement sensor and, as mentioned above, the distance measured may be referred to as displacement. For example, inductive, capacitive, acoustic, and laser-containing sensors may be used, although any known or hereinafter developed sensor that is capable of determining distance between the sensor and a measured object may be used. In various embodiments, the sensor does not require contact with the measured object, and, as such, these embodiments tend to experience lessened contact related wear.

A sensor may be configured to measure distances appropriate for the application. For example, a sensor may be able to measure distances of from about 0.01 mils (1 mil is equal to 0.001 inches) to about 4 inches. However, in various embodiments, a range consistent, from about 0.1 mils to about 115 mils is used. In further embodiments, and in particular where space within an axle is limited, a range of from about 0.5 mils to about 8 mils.

A sensor may be mounted inside an axle using any suitable means known or hereinafter developed. For example, a sensor may be mounted directly in an axle using one or more fastening mechanisms such as screws, rivets, or the like. A sensor may be mounted using a bracket or other mounting device and a fastening mechanism. Periodically, as the methods described herein utilize relative displacement between the sensor and other components, the exact positing of the sensor with the axle need not be known prior to use.

A wheel speed detection module may be in electrical or wireless communication with a sensor to receive information from a sensor. For example, a sensor may send information relating to the distance between the sensor and a variable thickness target. A wheel speed detection module may contain a computing device (e.g., a processor) and an associated memory. The associated memory may comprise an article of manufacture including a computer-readable medium having instructions stored thereon that, if executed by a computing device (e.g., a processor), cause the computing device to perform various methods.

For example, with reference now to FIG. 1, wheel speed detection system 100 is illustrated. Sensor 106 is mounted within aircraft axle 102 and secured with mounting device 108. Variable thickness target 110 is coupled to hubcap 104. Variable thickness target 110 may be coupled to hubcap 104 using any suitable means, such as a screw or other fastening mechanism. Variable thickness target 110 is coupled to hubcap 104 such that a point on variable thickness target 110 may correspond to a point on hubcap 104 throughout one revolution of hubcap 104. In other words, one revolution of hubcap 104 will cause the variable thickness target 110 to rotate one revolution. Other coupling configurations between variable thickness target 110 and hubcap 104 are contemplated, however, and such configurations may need to be taken into account when determining wheel speed. Sensor 106 is configured to measure the distance between sensor 106 and variable thickness target 110.

Figure 2:
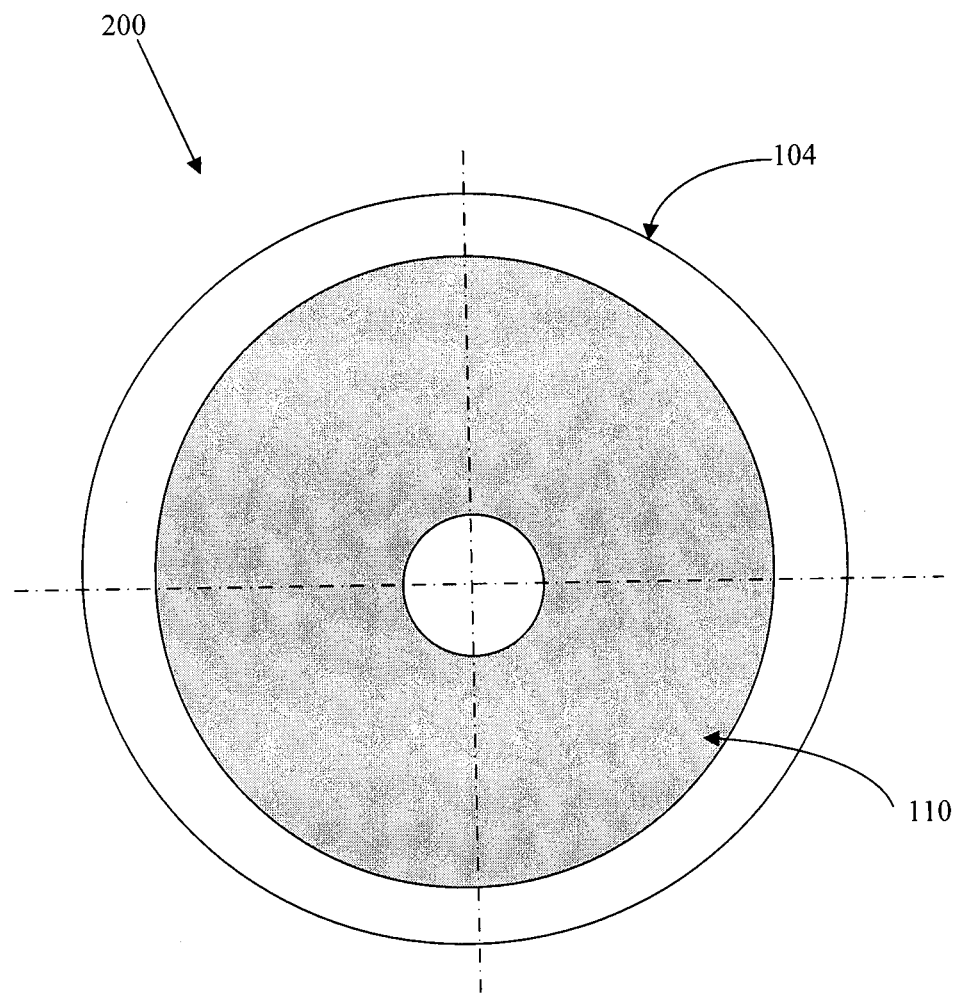
FIG. 2 illustrates a top view of a wheel speed detection system in accordance with various aspects of an embodiment.

With reference now to FIG. 2, hubcap 104 and variable thickness target 110 is illustrated from a top perspective showing a division of the variable thickness target 110 into quadrants. As shown, variable thickness target 110 has a constant diameter and a variable thickness. The thickness of variable thickness target 110 from the first quadrant (top, right side quadrant) to the fourth quadrant (top, left side quadrant) varies such that variable thickness target 110 has a maximum thickness and a minimum thickness.

Figure 3:
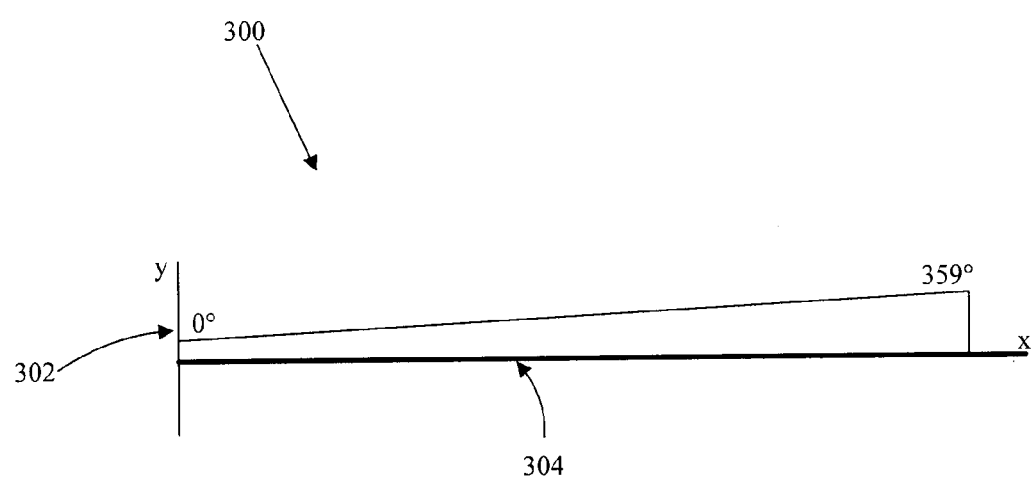
FIG. 3 illustrates a graph of distance between a sensor and a variable thickness target in accordance with various aspects of an embodiment.

Referring back to FIG. 1, sensor 106 may measure the distance between variable thickness target 110 and sensor 106 at least twice. If hubcap 104 (and, thus, variable thickness target 110) rotates, the distance between variable thickness target 110 and sensor 106 changes. As discussed above, the distance between variable thickness target 110 and sensor 106 may be correlated to a rotational location on variable thickness target 110. Accordingly, as the distance between variable thickness target 110 and sensor 106 changes, the corresponding rotational location on variable thickness target 110 changes. Variable thickness target 110 may have a step configuration, as described above. If the distance between sensor 106 and variable thickness target 110 is measured during one revolution of variable thickness target 110, a graph such as the one shown in FIG. 3 is obtained. With reference to FIG. 3, graph 300 is illustrated as the distance 302 between variable thickness target 110 and sensor 106 is shown on the y axis and the degree of rotation 304 to complete one revolution of variable thickness target 110 is shown along the x axis. As illustrated, a maximum thickness may be observed at about 0 degrees (and, thus, a minimum distance is measured) and a minimum thickness may be observed at about 359 degrees (and, thus a maximum distance is observed). If variable thickness target 110 had a wave configuration, as described above, a graph of distance against degree of rotation such as the one in FIG. 3 would yield a sine type wave.

Figure 10A:
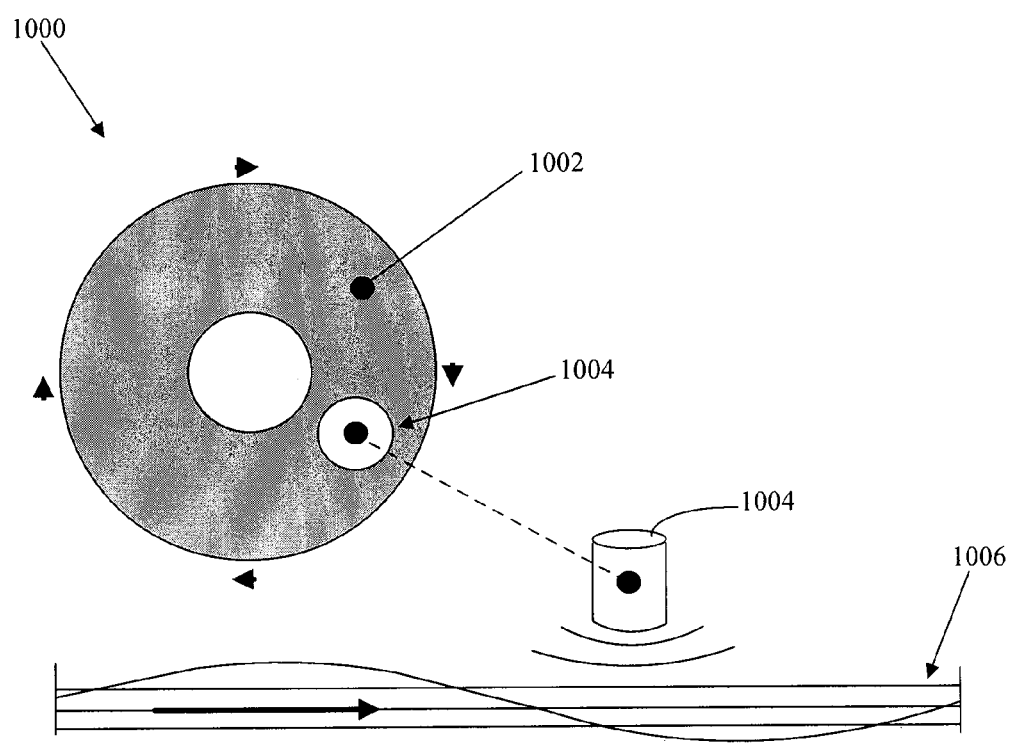
FIGS. 10a and 10b illustrate an exemplary graph associated with various aspects of various embodiments.
Figure 10B:
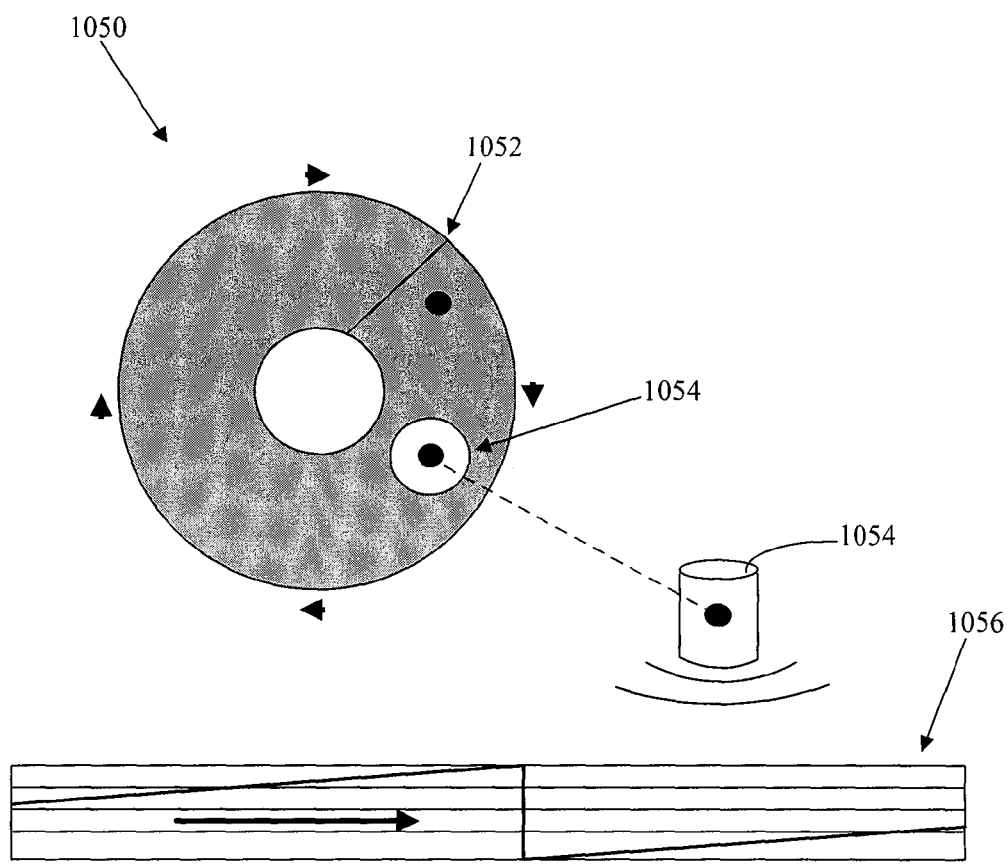

With momentary reference to FIGS. 10a and 10b, graphs are shown of the wave configuration and the step configuration of variable thickness targets. FIG. 10a shows variable thickness target 1000 having a wave configuration with minimum thickness 1002. Sensor 1004 detects the distance between the sensor and variable thickness target 1000 during one revolution of variable thickness target 1000. The distances from 0 degrees to 359 degrees are plotted on the x-y axis illustrated as wave 1006. Note that the minimum thickness 1002 corresponds to a maximum distance between variable thickness target 1000 and sensor 1004.

With momentary reference to FIG. 10b, a graph is shown of the step configuration of variable thickness targets. FIG. 10b shows variable thickness target 1050 having a step configuration step 1052 (the step comprises a minimum thickness adjacent to a maximum thickness). Sensor 1054 detects the distance between the sensor and variable thickness target 1050 during one revolution of variable thickness target 1050. The distances from 0 degrees to 359 degrees are plotted on the x-y axis illustrated as step function 1056. Note that the step 1052 corresponds to the midpoint of the graph.

In an embodiment and with reference back to FIG. 1, a wheel speed detection module (not shown) is in electrical communication with sensor 106 and configured to receive information from sensor 106. Sensor 106 may send information relating to the distance between the sensor and the variable thickness target and/or the time a measurement was made to wheel speed detection module. Wheel speed detection module may use the information from sensor 106 to determine wheel speed using, for example, methods described above and, if configured with the relevant data, aircraft velocity, and acceleration. In various embodiments, if sensor 106 detects a larger than expected distance, wheel speed detection module may interpret such a signal as the loss of a hubcap and trigger appropriate warnings to the aircraft's pilot.

For example, wheel speed detection module may comprise information correlating, mapping, or otherwise relating the rotational position on a variable thickness target to a corresponding distance between a sensor and a variable thickness target. Wheel speed detection module may receive a first distance from sensor 106 and a second distance from sensor 106 over a first time interval. Wheel speed detection module may then determine a first rotational location corresponding to the first distance and a second rotational location corresponding to the second distance. Wheel speed detection module may divide the difference between the first rotational location and the second rotational location and divide by the time interval. The wheel speed detection module may further determine acceleration by dividing the difference between two velocity measurements by the time interval over which the velocity measurements were taken. Acceleration information may be useful to other aircraft components, such as braking systems that may use acceleration information to perform anti-skid actions. Wheel speed detection module may further comprise information relating to the hub cap and/or variable thickness target, such as the radius of the hub cap and/or variable thickness target.

In various embodiments, systems and methods for tire pressure monitoring are provided. Tire pressure may be monitored by placing a selectively deformable vessel in fluid communication with a tire. A sensor may be used to determine the distance between the sensor and the selectively deformable vessel. The distance may be used to determine tire pressure.

A selectively deformable vessel may be any vessel that has at least one wall or wall portion that is deformable. A deformable wall or wall portion may be susceptible to deformation responsive to fluid pressure inside the selectively deformable vessel. As used herein, the term "deformable wall" also includes both a wall that is deformable and a wall having a deformable portion. A selectively deformable vessel may also comprise walls or wall portions that are less susceptible to deformation than the deformable wall. Such walls may be referred to herein as rigid walls. Thus, when a selectively deformable vessel is filled with a fluid, the deformable wall may deform responsive to fluid pressure while the rigid walls of the selectively deformable vessel remain undeformed. However, in various embodiments, a selectively deformable vessel may be comprised entirely of walls or wall portions that are deformable. Thus, in such embodiments, when such a selectively deformable vessel is filled with a fluid, all walls may deform responsive to fluid pressure.

A selectively deformable vessel may comprise a variety of shapes and sizes. Any geometric shape is contemplated, including irregular shapes. For example, a selectively deformable vessel may comprise any polyhedron. In various embodiments, a selectively deformable vessel is cylindrical. A selectively deformable vessel may be made of any suitable material, such as metal, plastic, or the like.

A selectively deformable vessel may be formed by joining (e.g., welding) a wall or wall portion to a vessel wherein the wall or wall portion has a thickness less than that of another wall or wall portion. In other embodiments, a selectively deformable vessel may be formed by stamping or machining.

Irrespective of the method manufacture, a selectively deformable vessel may comprise a cylinder having a base portion of one thickness and an end cap of a lesser thickness. As the selectively deformable vessel is exposed to a fluid pressure, the end cap deforms. For a given thickness and material, the fluid pressure may be determined from a displacement based on the amount of deformation. For example, for aircraft tires, a selectively deformable vessel may comprise a deformable wall that may indicate a pressure from about 10 lbs/in$^2$ to about 800 lbs/in$^2$. Tire manufacturers offer tires designed to be operated at varying pressures. In various embodiments, depending on the type of tires intended to be measured, a deformable wall may indicate a pressure from about 30 lbs/in$^2$ to about 500 lbs/in$^2$. In further embodiments, depending upon the type of tire to be measured, a deformable wall may indicate a pressure of from about 50 lbs/in$^2$ to about 400 lbs/in$^2$.

In further embodiments, a selectively deformable vessel may comprise a cylinder having a base portion and an end cap of the same or substantially same thickness. As the selectively deformable vessel is exposed to a fluid pressure, both the base portion and the end cap deform. For a given thickness of the base portion and end cap, the fluid pressure may be determined from a displacement based on the amount of deformation. For example, for aircraft tires, in such embodiments, a selectively deformable vessel may indicate any pressure as described herein above.

A tire pressure monitor controller may be in electrical or wireless communication with a sensor to receive information from the sensor. For example, a sensor may send information relating to the distance between the sensor and a selectively deformable vessel. A tire pressure monitor controller may contain a computing device (e.g., a processor) and an associated memory. The associated memory may comprise an article of manufacture including a computer-readable medium having instructions stored thereon that, if executed by a computing device (e.g., a processor), cause the computing device to perform various methods.

Figure 4:
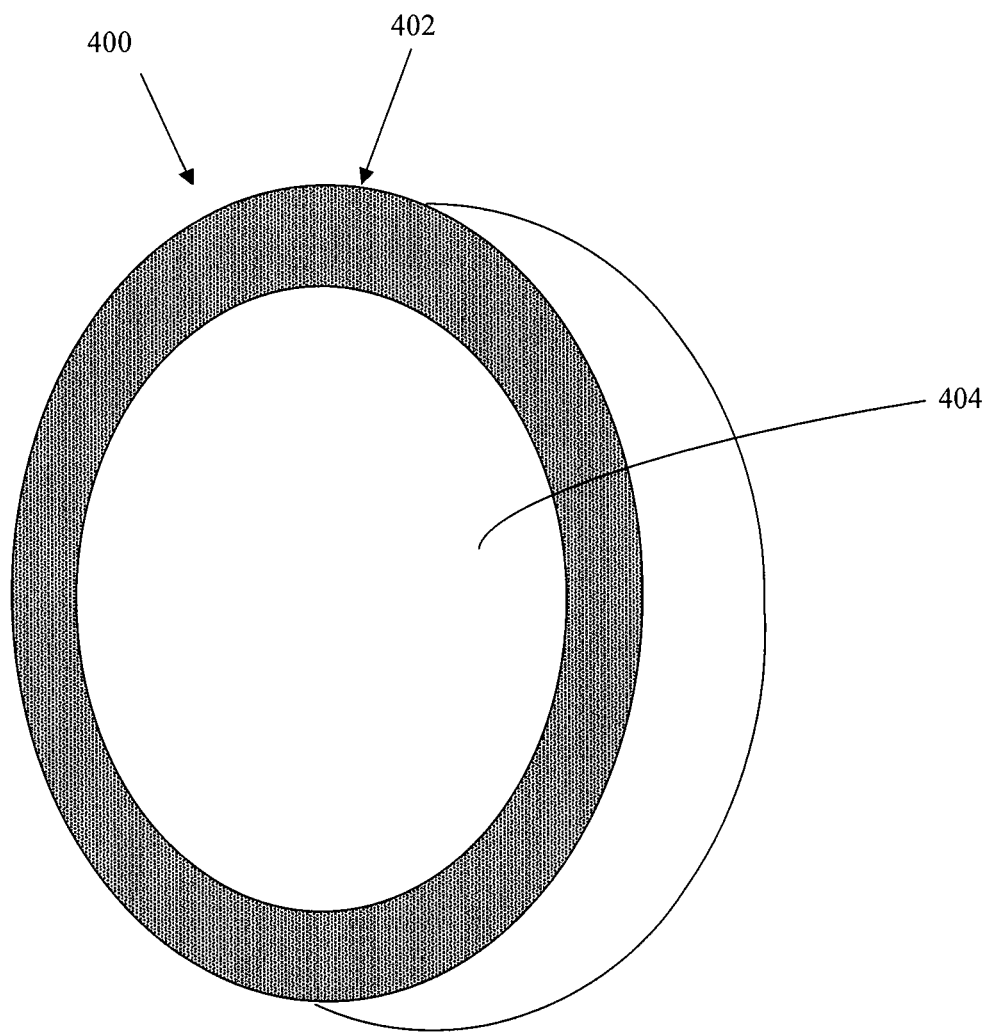
FIG. 4 illustrates a selectively deformable vessel in accordance with various aspects of an embodiment.

For example, an embodiment of a selectively deformable vessel 400 is shown in FIG. 4. Rigid portion 402 of selectively deformable vessel 400 is shown. Deformable wall 404 is shown as an end cap on selectively deformable vessel 400. Selectively deformable vessel 400 is made of stainless steel, although in various embodiments, other suitable materials may be substituted. Deformable wall 404 may be welded to rigid portion 404.

Figure 6:
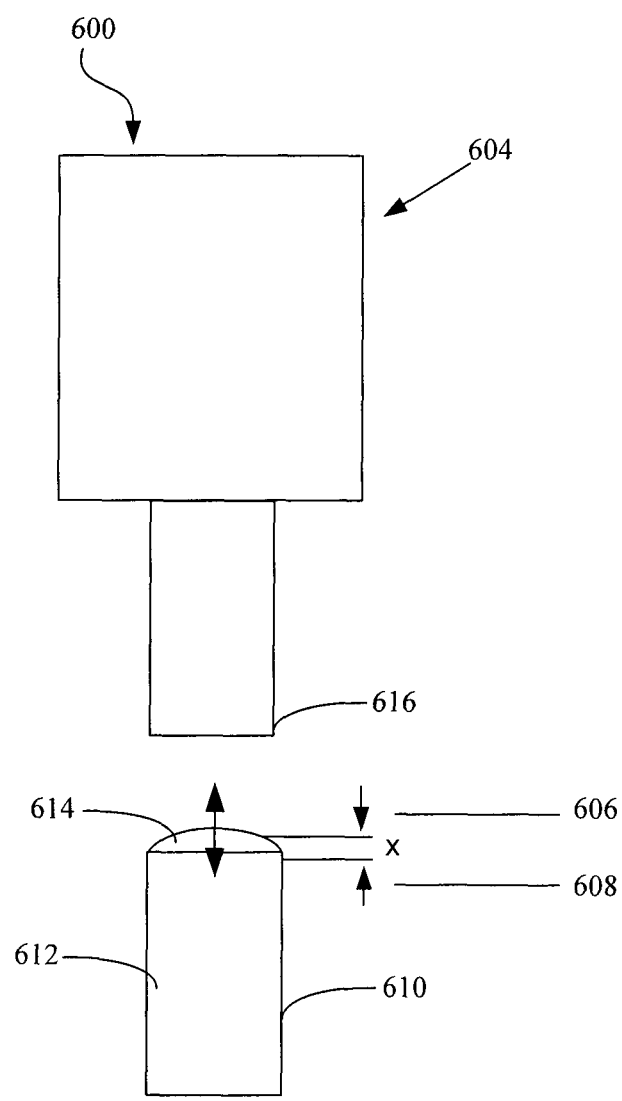
FIG. 6 illustrates a tire pressure monitoring system in accordance with various aspects of an embodiment.

With reference now to FIG. 6, pressure system 600 is shown having selectively deformable vessel 610 and sensor 604. Selectively deformable vessel 610 has rigid portion 612 and deformable wall 614. Sensor 604 is configured to measure the distance between point 616 on sensor 604 and deformable wall 614. Such distance is used to calculate tire pressure.

When there is not sufficient fluid pressure within selectively deformable vessel 610 to deform deformable wall 614, deformable wall is at rest position 608. At rest position 608, sensor 604 measures the distance between point 616 and rest position 608. When selectively deformable vessel 610 contains a fluid that exerts pressure sufficient to deform deformable wall 614, deformable wall 614 deforms and assumes deformed position 606. At deformed position 606, sensor 604 measures the distance between point 616 and deformed position 606. The difference between the distances measured at deformed position 606 and rest position 608 (shown as "x" in FIG. 6) may be used to determine the pressure within selectively deformable vessel 610.

Tire pressure monitor controller (not shown in FIG. 6) may be in electrical communication with sensor 604 and receive information from sensor 604. Tire pressure monitor controller may record distances and times of measurement in a memory and compute differences in the distances stored. Tire pressure monitor controller may comprise mappings, correlations, or other associations that relate differences in deformation distance to pressure within selectively deformable vessel. Such mapping, correlations, or other associations may be derived empirically, may be altered due to operating conditions such as temperature, and may be dependent upon the size and composition of the selectively deformable vessel itself. In various embodiments, a tire pressure monitor is in electrical communication with other devices that detect operating conditions, such as a temperature measuring device for receiving temperature information. Tire pressure monitor controller and wheel speed detection module may comprise the same computing device (e.g., processor) and memory.

Figure 5:
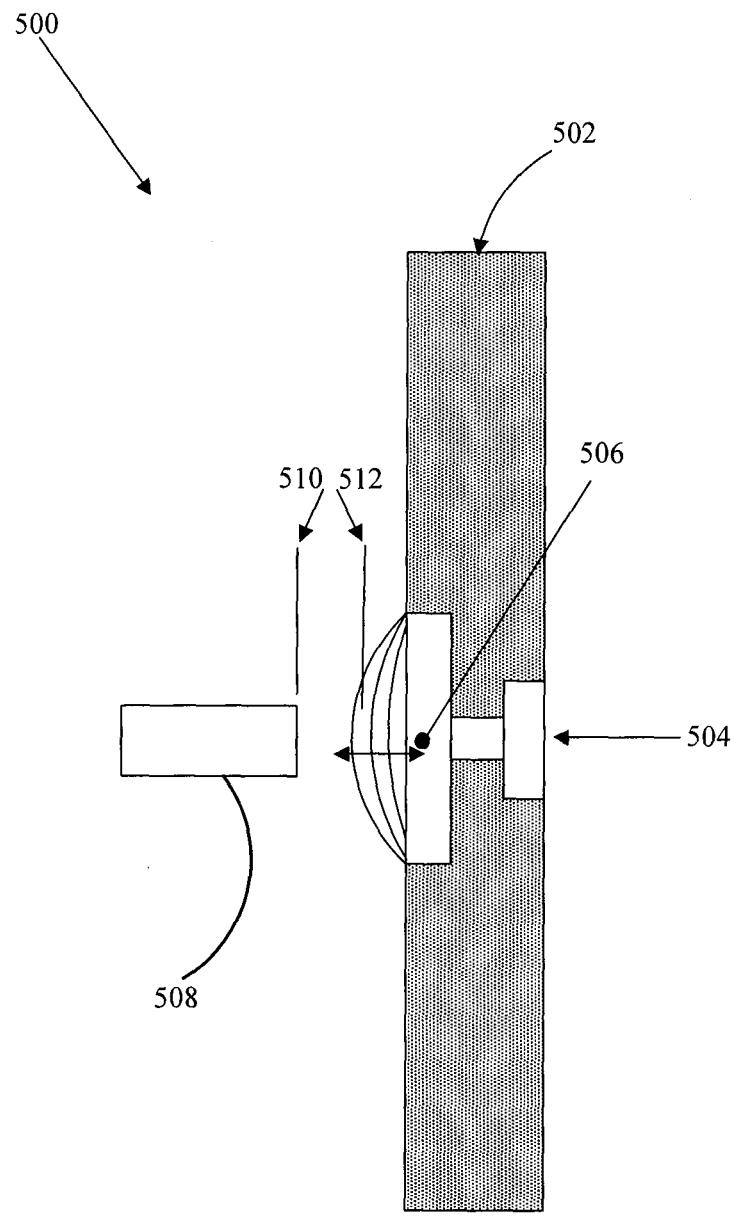
FIG. 5 illustrates a tire pressure monitoring system in accordance with various aspects of an embodiment.

With reference now to FIG. 5, tire pressure monitoring system 500 is shown having selectively deformable vessel 506. Hubcap 502 is shown having an aperture for the disposition of inlet 504. Inlet 504 is a conduit between selectively deformable vessel 506 and the tire (not shown). Thus, fluid communication may be established between selectively deformable vessel 506 and the tire. The tire may have a tube or other fluid communication means connected to inlet 504. For example, a tube may attach to a tire at a tire stem and lead to inlet 504. Thus, in various embodiments, selectively deformable vessel 506 is in fluid communication with a tire and, accordingly, selectively deformable vessel 506 will contain a fluid at a pressure that relates to or is equal to the tire pressure.

Sensor 508 may be mounted within an axle. Sensor 508 is configured to measure the distance between the deformable wall of selectively deformable vessel 506 and sensor 508. For example, deformable wall may be at rest position 510. The distance between sensor 508 and the deformable wall in rest position 510 is shown as y in FIG. 5. When the tire is inflated and selectively deformable vessel 506 becomes pressurized, the deformable wall takes deformed position 512. The distance between sensor 508 and the deformable wall in deformed position 512 is shown as x in FIG. 5.

Sensor 508 may be in electrical communication with tire pressure monitor controller (not shown). Tire pressure monitor controller may receive distance information from sensor 508 and determine the tire pressure.

Figure 7:
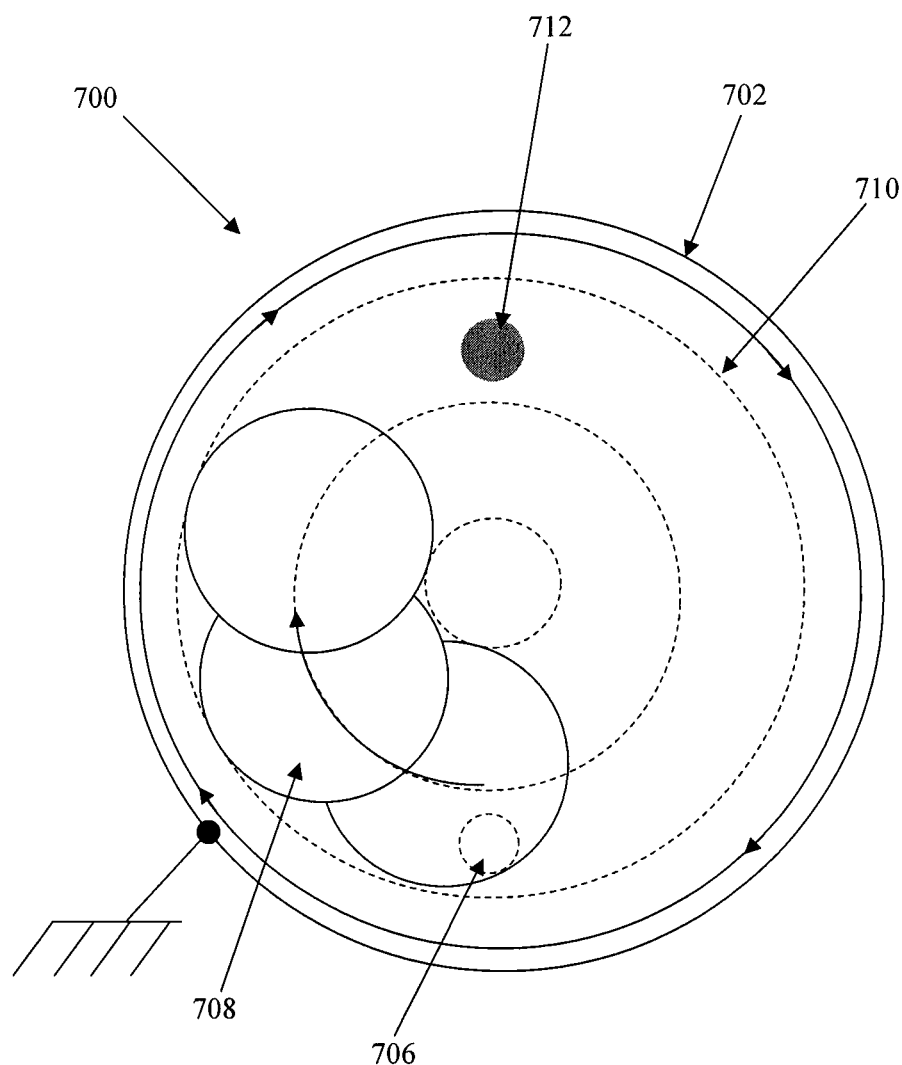
FIG. 7 illustrates a top view tire pressure monitor system and wheel speed detection system in accordance with various aspects of an embodiment.

Tire pressure and wheel speed may be monitored/determined using various combinations of systems. For example, tire pressure/wheel speed monitoring system 700 is shown in FIG. 7. FIG. 7 is illustrated from a top view of hub cap 702 and variable thickness target 710. Sensors 712 and 706 are placed approximately 180 degrees apart, though each sensor may be placed any degree of rotation apart. Sensors 712 and 706 are configured to measure the distance between variable thickness target 710 and the measuring sensor. Sensors 712 and 706 may be of any type disclosed herein or otherwise known or as of yet unknown. As disclosed herein, the distance may be used to determine wheel speed. Two sensors are used in an embodiment for redundancy purposes, however, in various embodiments, the useful of two sensors may be useful in the measurement of tire pressure. Sensors 712 and 706 are in communication with a tire pressure monitor controller and wheel speed detection module.

With continued reference to FIG. 7, selectively deformable vessel 708 is disposed at least partially within variable thickness target 710. Selectively deformable vessel 708 is disposed so that it is not coaxial with variable thickness target 710, although in various embodiments, selectively deformable vessel 708 is coaxial with variable thickness target 710. Selectively deformable vessel 708 may be in fluid communication with a tire (not shown).

Sensor 712 and sensor 706 may be used to monitor tire pressure and determine wheel speed. As described above, sensor 712 and sensor 706 may measure the distance between the measuring sensor and variable thickness target 710 to determine wheel speed. In addition, if variable thickness target 710 is in motion, selectively deformable vessel 708 may pass sensor 712 and 706 during a revolution of variable thickness target 710. When this occurs, there may be a sudden change in the distance between the measuring sensor and the variable thickness target. In this event, the wheel speed detection module may interpret this distance as relating to tire pressure. This interpretation may involve the assessment of data from sensor 706. As sensor 706 and sensor 712 monitor distances, and a range of distances are known for both the variable thickness target 710 and the selectively deformable vessel 708, each sensor's output will correlate to a particular position during rotation. Accordingly, when a sensor detects selectively deformable vessel 708, the information may be passed to the tire pressure monitor controller for tire pressure evaluation. When selectively deformable vessel 708 passes a sensor, the measuring sensor may interpret the data as relating to wheel speed.

A system such as that shown in FIG. 7 may have a selectively deformable vessel disposed substantially coaxial to variable thickness target. Such an embodiment is shown in cross section in FIG. 8. Variable thickness target 810 is shown where the thickness is measured on the y axis and degree of rotation is on the x axis. Selectively deformable vessel 804 is disposed substantially coaxial with variable thickness target 810. Sensor 816 monitors the distance between variable thickness target 810 and sensor 816. Sensor 812 monitors the distance between variable thickness target 810 and sensor 812. The output of at least one or both of sensors 812 and 816 are used in determining wheel speed, in accordance with methods described herein. Sensor 814 measures the distance between selectively deformable vessel 804 and sensor 814. This information is used in monitoring tire pressure, in accordance with methods described herein.

Figure 8:
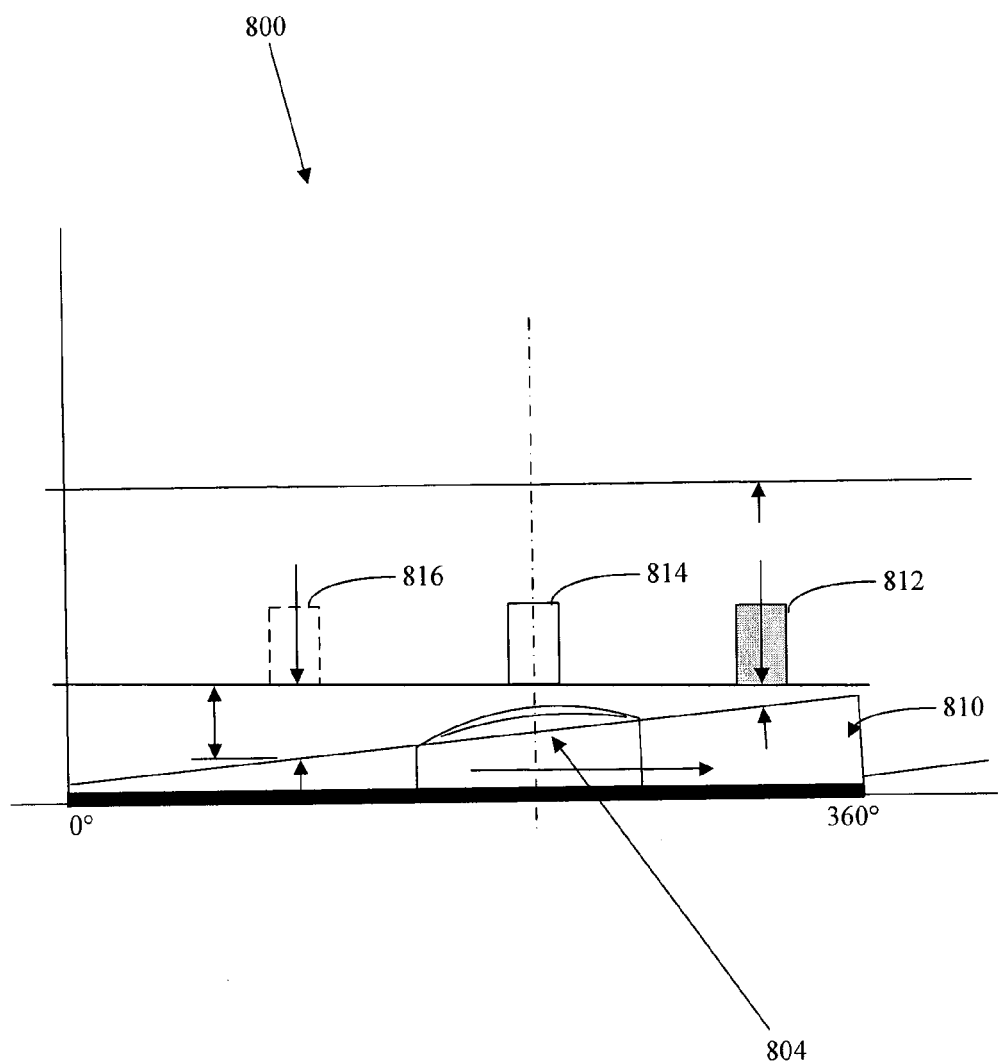
FIG. 8 illustrates a cross sectional view of a tire pressure monitor system and wheel speed detection system in accordance with various aspects of an embodiment.

A further embodiment comprises a system such as that shown in FIG. 8 having a sensor analogous to 816 in an offset position so that such a sensor may measure the distance from the sensor to the variable thickness target and, in at least a partial rotation, the selectively deformable vessel. Such an embodiment may measure tire pressure and wheel speed using any of the methods disclosed herein. In addition, such an embodiment would provide redundancy for both wheel speed and tire pressure in the event one sensor failed.

Figure 11:
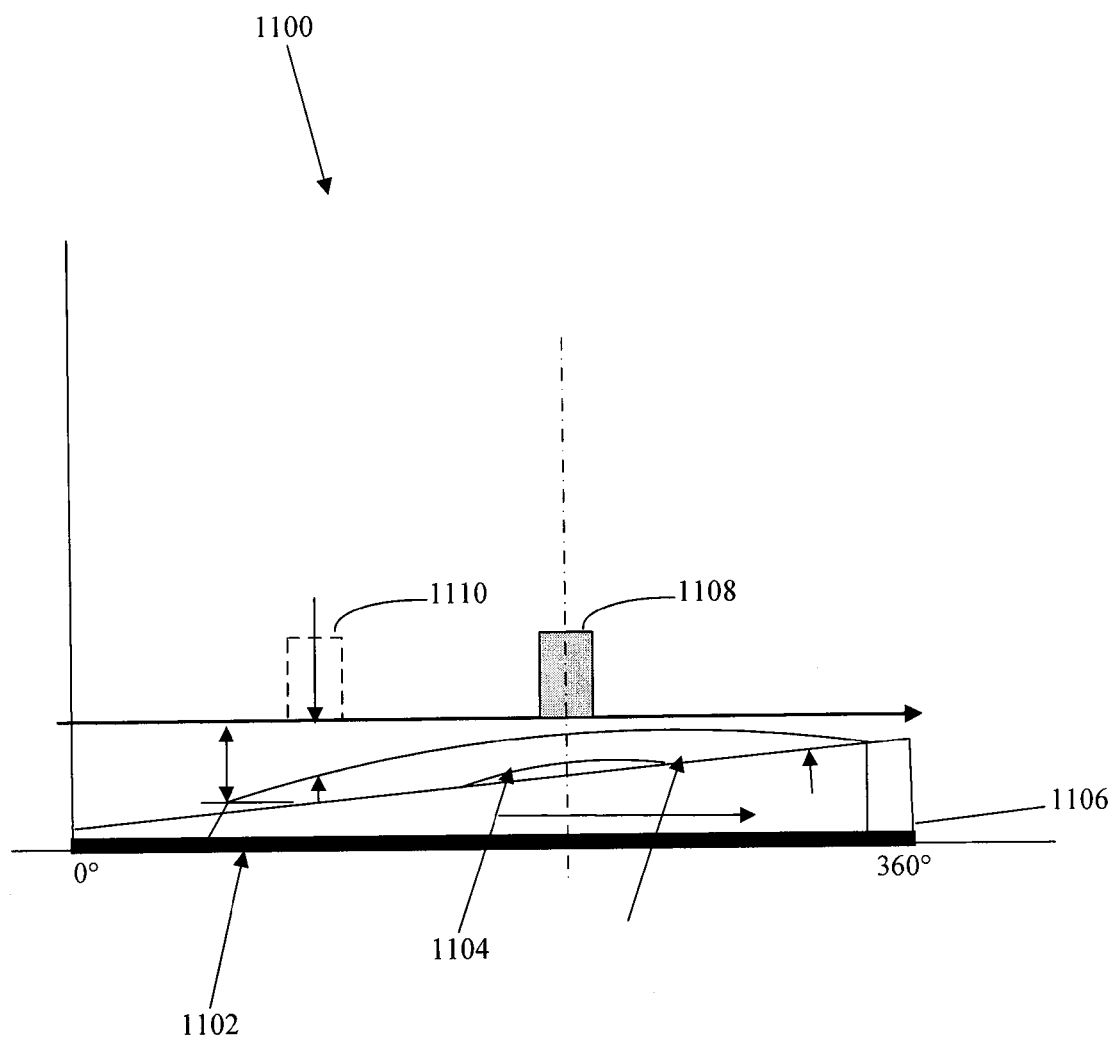
FIG. 11 illustrates a tire pressure monitor system and wheel speed detection system in accordance with various aspects of an embodiment.

A system having a selectively deformable vessel disposed substantially coaxial to variable thickness target is shown in FIG. 11 in cross section. Variable thickness target 1106 is shown where the thickness is measured on the y axis and degree of rotation is on the x axis. Selectively deformable vessel 1104 is disposed substantially coaxial with variable thickness target 1106. Sensor 1110 monitors the distance between variable thickness target 1106 and sensor 1110 for use in determining wheel speed, in accordance with methods described herein. Sensor 1108 measures the distance between selectively deformable vessel 1104 and sensor 1108. This information is used in monitoring tire pressure, in accordance with methods described herein.

An embodiment of a tire pressure/wheel speed monitoring system 900 is shown in FIG. 9*a*. FIG. 9*a* is a top view of variable thickness target 902, which is coupled to an aircraft hubcap (not shown). Sensors 904 and 908 are shown above variable thickness target 902. Sensors 904 and 908 are configured to measure the distance between variable thickness target 902 and the measuring sensor. Sensors 904 and 908 may be of any type discussed herein. As disclosed herein, the distance measured by sensors 904 and 908 may be used to determine wheel speed.

With continued reference to FIG. 9*a*, selectively deformable vessel 910 is disposed at least partially within variable thickness target 902. Selectively deformable vessel 910 is disposed so that it is no coaxial with variable thickness target 902. Selectively deformable vessel 910 may be in fluid communication with a tire (not shown).

Sensor 904 and sensor 908 may be used to monitor tire pressure and determine wheel speed. As described above, sensor 904 and sensor 908 measure the distance between the measuring sensor and variable thickness target 910 to determine wheel speed. In addition, if variable thickness target 902 is in motion, selectively deformable vessel 910 may pass sensor 904 and 908 during a revolution of variable thickness target 902. When this occurs, there may be a sudden change in the distance between the measuring sensor and the variable thickness target.

With reference to FIG. 9*b*, a graph of distance between sensor 904 and variable thickness target 902/selectively deformable vessel 910 is shown. The x axis shows degree of rotation and the y axis shows distance between sensor 904 and variable thickness target 902/selectively deformable vessel 910. The wheel speed detection module may receive data from sensor 904 such as that shown in FIG. 9*b*. A wheel speed detection module may contain information related to the expected distances between the variable thickness target and sensor 904. When the wheel speed detection module detects an unexpected data point, such as point 920, the wheel speed detection module may determine that the unexpected point represents selectively deformable vessel 910. Accordingly, the wheel speed detection module begins to forward information from sensor 904 (now referred to as tire pressure distance information) to a tire pressure monitor controller for use in monitoring tire pressure. At expected end point 922, the wheel speed detection module may recognize that the distance reported by sensor 904 is consistent with the distances expected from the variable thickness target 902. Accordingly, the wheel speed detection module may continue to determine wheel speed information.

In various embodiments, when sensor 904 is detecting tire pressure distance information, sensor 908 is not detecting tire pressure distance information, as, in various embodiments, selectively deformable vessel 910 is configured to only be detected by one sensor at a time. Accordingly, while sensor 904 is detecting tire pressure distance information, sensor 908 may deliver information relating to the variable thickness target. Thus, wheel speed detection module may continue to determine wheel speed using information from sensor 908. In various embodiments, this dual sensor configuration provides continuous wheel speed detection, including detection of a 0 velocity. In various embodiments, this dual sensor configuration may provide continuous tire pressure monitoring where one sensor is configured to detect a selectively deformable vessel while the other is detecting the variable thickness target. However, in various embodiments there may be degrees of rotation during which neither sensor detects a selectively deformable vessel.

With reference to FIG. 7, a wheel speed detection module may assess data from sensor 706 and determine whether the sensor is measuring the displacement from variable thickness target 710 to sensor 706 or from the selectively deformable vessel 708 to sensor 706. As sensor 706 and sensor 712 monitor distances, and a range of distances are known for both the variable thickness target 710 and the selectively deformable vessel 708, each sensor's output will correlate to a particular position during rotation. Accordingly, when a sensor detects selectively deformable vessel 708, the information may be passed to the tire pressure monitor controller for tire pressure evaluation. When selectively deformable vessel 708 passes, the measuring sensor may interpret the data as relating to wheel speed.

With reference back to FIG. 9a, an additional embodiment comprises the features of FIG. 9a without either sensor 904 or sensor 908. In such a single sensor embodiment, wheel speed and tire pressure may be detected using methods consistent with the methods disclosed above. However, in a single sensor embodiment, when the single sensor is detecting tire pressure, wheel speed is not able to be detected. Further, when wheel speed is being detected by the single sensor, tire pressure is not able to be detected as the selectively deformable vessel would be out of range.

A selectively deformable vessel may further comprise a variable thickness target. In such embodiments, a wheel speed detection module may store the data relating to the varying thickness of the variable thickness target. A tire pressure monitor controller may store data relating to determining tire pressure from deformable wall displacement. Upon receipt of displacement information gathered from measuring the distance from a sensor to the combined selectively deformable vessel/variable thickness target, the tire pressure monitor controller will determine the relative rotational position of the combined selectively deformable vessel/variable thickness target. The tire pressure monitor controller may pass this displacement information and the rotational position to the tire pressure monitor controller. The tire pressure monitor controller may then determine tire pressure based upon the received information. In other words, the tire pressure monitor controller will subtract the displacement attributable to the variable thickness target to obtain the displacement due to the tire pressure.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
   a hub cap;
   a target coupled to the hub cap; and
   a displacement sensor configured to measure a displacement between the displacement sensor and the target,
   wherein the target has a variable thickness, and
   wherein the displacement between the displacement sensor and the target is configured to vary as the hub cap rotates.

2. The system of claim 1, wherein the displacement sensor is at least one of inductive, capacitive, acoustic, and laser-containing, 3. The system of claim 1, further comprising a monitoring controller.

4. The system of claim 1, wherein the displacement between the displacement sensor and the target continuously increases in response to the hub cap rotating from about 0 degrees to about 359 degrees.

5. The system of claim 1, wherein the displacement between the displacement sensor and the target continuously increases in response to the huh cap rotating from about 0 degrees to about 180 degrees, and wherein the displacement between the displacement sensor and the target continuously decreases in response to the hub cap rotating from about 180 degrees to about 359 degrees.

6. The system of claim 1, wherein the displacement sensor is disposed within an axle of an aircraft.

7. The system of claim 6, wherein the displacement sensor is affixed to the axle of an aircraft using a screw.

8. The system of claim 1, wherein the displacement sensor is configured to send an alert signal in response to the displacement between the sensor and the target exceeding a maximum preset value.

* * * * *